(12) United States Patent
Scott

(10) Patent No.: US 8,411,279 B2
(45) Date of Patent: Apr. 2, 2013

(54) REMOTE SEISMIC SURVEYING SYSTEMS AND METHODS

(76) Inventor: Gary Lee Scott, Richmond, TX (US)

( * ) Notice: Subject to any disclaimer, the term of this patent is extended or adjusted under 35 U.S.C. 154(b) by 653 days.

(21) Appl. No.: 12/462,962

(22) Filed: Aug. 12, 2009

(65) Prior Publication Data

US 2011/0038226 A1 Feb. 17, 2011

(51) Int. Cl.
*G01B 11/02* (2006.01)
(52) U.S. Cl. .................................. 356/498; 356/502
(58) Field of Classification Search .............. 356/498, 356/502, 28.5
See application file for complete search history.

(56) References Cited

U.S. PATENT DOCUMENTS 5,070,483 A * 12/1991 Berni ........................ 367/14

* cited by examiner

*Primary Examiner* — Tarifur Chowdhury
*Assistant Examiner* — Jonathon Cook
(74) *Attorney, Agent, or Firm* — Karen B. Tripp

(57) ABSTRACT

Remote seismic surveying systems and methods are disclosed. At least some embodiments illuminate a water or ground surface with a beam from a coherent electromagnetic wave source. Reflected electromagnetic energy is focused onto an image plane where it combines with a reference beam to form an interference pattern. Electronics track the intensity versus time for multiple points in the image and derive displacement signals for various physical locations in the survey region. These displacement signals are associated with seismic source firing times and locations before being stored as seismic traces in a survey database. Some variations use the reflected electromagnetic energy to create multiple interference patterns that vary due to different path length differences, thereby eliminating signal phase ambiguities.

13 Claims, 3 Drawing Sheets

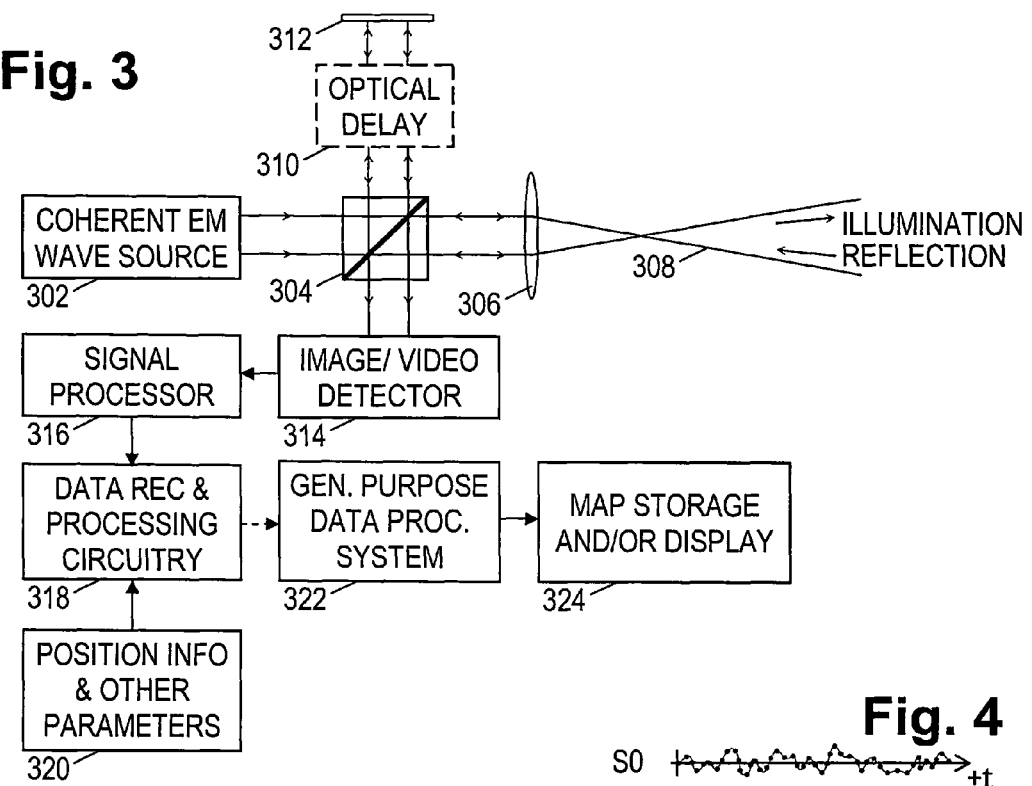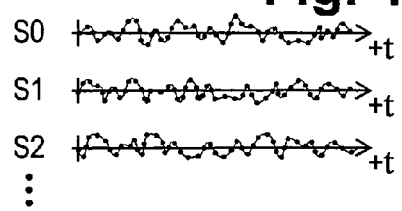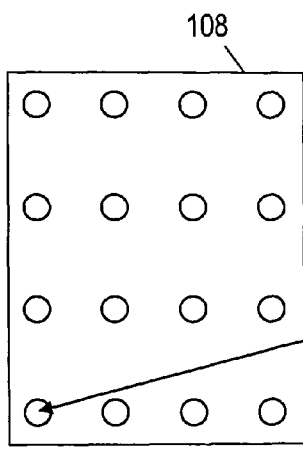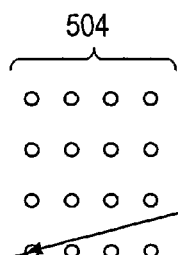

REMOTE SEISMIC SURVEYING SYSTEMS AND METHODS

BACKGROUND

Scientists and engineers often employ seismic surveys for exploration, archeological studies, and engineering projects. Seismic surveys can provide information about underground structures, including formation boundaries, rock types, and the presence or absence of fluid reservoirs. Such information greatly aids searches for water, geothermal reservoirs, and mineral deposits such as hydrocarbons and ores. Oil companies in particular often invest in extensive seismic surveys to select sites for exploratory oil wells.

Conventional seismic surveys employ artificial seismic energy sources such as shot charges, air guns, or vibratory sources to generate seismic waves. The sources, when fired, create a seismic "event", i.e., a pulse of seismic energy that propagates as seismic waves from the source down into the earth. Faults and boundaries between different formations create differences in acoustic impedance that cause partial reflections of the seismic waves. A seismic sensor array detects and records these reflections for later analysis. Sophisticated processing techniques are applied to the recorded signals to extract an image of the subsurface structure.

The sensor arrays used to detect the seismic waves include hundreds or even thousands of sensors that are arranged in a systematic pattern and linked to data recorders. The sensors arrays require a substantial amount of effort to deploy and re-position throughout the survey process, adding to the time and cost of performing a survey. One remote sensing technology has been proposed elsewhere (See, e.g., U.S. Pat. No. 5,070,483, "Remote Seismic Sensing" to Albert Berni), but to the best of the inventor's knowledge it has not been commercialized and its performance is unknown. Without access to such technologies, seismic explorationists must continue to rely on expensive and time consuming survey techniques.

SUMMARY

Accordingly, there is disclosed herein various systems and methods that permit remote sensing of displacements in the Earth's surface. Such displacements can be translated into seismic traces, enabling a flying platform to perform the function of a large seismic array at a small fraction of the cost. At least some system and method embodiments illuminate a water or ground surface with a beam from a coherent electromagnetic wave source. Reflected electromagnetic energy is focused onto an image plane where it combines with a reference beam to form an interference pattern. Electronics track the intensity versus time for multiple points in the image and derive displacement signals for various physical locations in the survey region. These displacement signals are associated with seismic source firing times and locations before being stored as seismic traces in a survey database. Some variations use the reflected electromagnetic energy to create multiple interference patterns that vary due to different path length differences, thereby eliminating signal phase ambiguities.

Video detectors capture the interference patterns and feed them to a signal processing system which can perform multiple functions including determining a relationship between locations in the video frames and physical locations on the Earth's surface. For each of multiple selected locations, the signal processing system determines a reference signal phase and compares it with the actual signal phase to determine a displacement signal. This displacement signal is associated with source firing locations and times and stored as seismic signal traces. In various embodiments the signal processor provides compensation for platform motion, platform vibration, and changes in measurement conditions. These and other embodiments are described in further detail below.

BRIEF DESCRIPTION OF THE DRAWINGS

A better understanding of the various disclosed embodiments can be obtained when the following detailed description is considered in conjunction with the following drawings, in which:

FIG. 3 is a block diagram of an illustrative survey system;

FIG. 4 shows illustrative seismic survey traces;

FIG. 5 shows a correspondence between survey points and midpoints;

Figure 1:
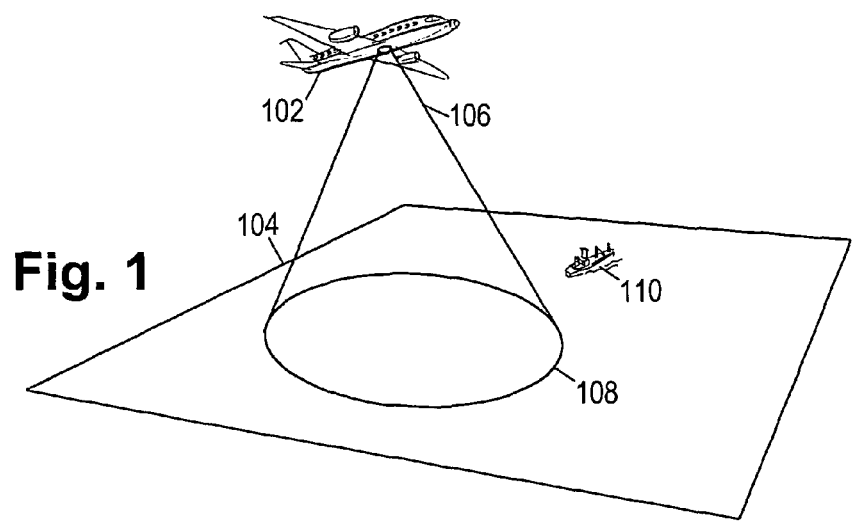
FIG. 1 shows an illustrative survey environment.

While the disclosed systems and methods are susceptible to various modifications and alternative forms, specific embodiments thereof are shown by way of example in the drawings and will herein be described in detail. It should be understood, however, that the drawings and detailed description related thereto are not intended to limit the disclosure to the particular embodiments shown and described, but on the contrary, the intention is to cover all modifications, equivalents and alternatives falling within the scope of the claims.

DETAILED DESCRIPTION

Remote sensing of seismic signals from an elevated platform (e.g., a helicopter, plane, satellite, or lighter-than-air craft) offers the ability to collect seismic survey data over a large area with a high detector-point density in a short amount of time, thereby making seismic surveys much more cost-effective. Moreover, multiple platforms can be employed simultaneously to increase sampling dimensionality, enlarge the survey area, and/or increase the measurement reliability, thereby providing seismic survey data of a quality that was previously infeasible.

FIG. 1 shows an illustrative survey environment. An airplane 102 flies above a surface 104 of the Earth and illuminates it with a coherent light beam 106. Surface 104 can be land or water though, for the purpose of this example, it is assumed to be water. Beam 106 is provided by a source of coherent electromagnetic wave energy. Examples of such sources include lasers, infrared lasers, masers, and radars. Beam 106 reflects from a sensing area 108, which is determined by the opening angle of the beam cone and the height of the plane. It is expected that sensing area 108 will be at least several square kilometers in size. Equipment on the plane processes the reflected light to measure displacements of the surface 104 in various portions of region 108.

Equipment on the plane 102 also tracks the position and orientation of the plane so that the physical locations in the sensing region 108 can be determined and tracked. The plane further receives information from a ground unit such as boat 110. The ground unit information specifies the locations and times at which a seismic energy source is triggered. With this information, the equipment on the plane can separate the displacement data into seismic traces.

Figure 2:
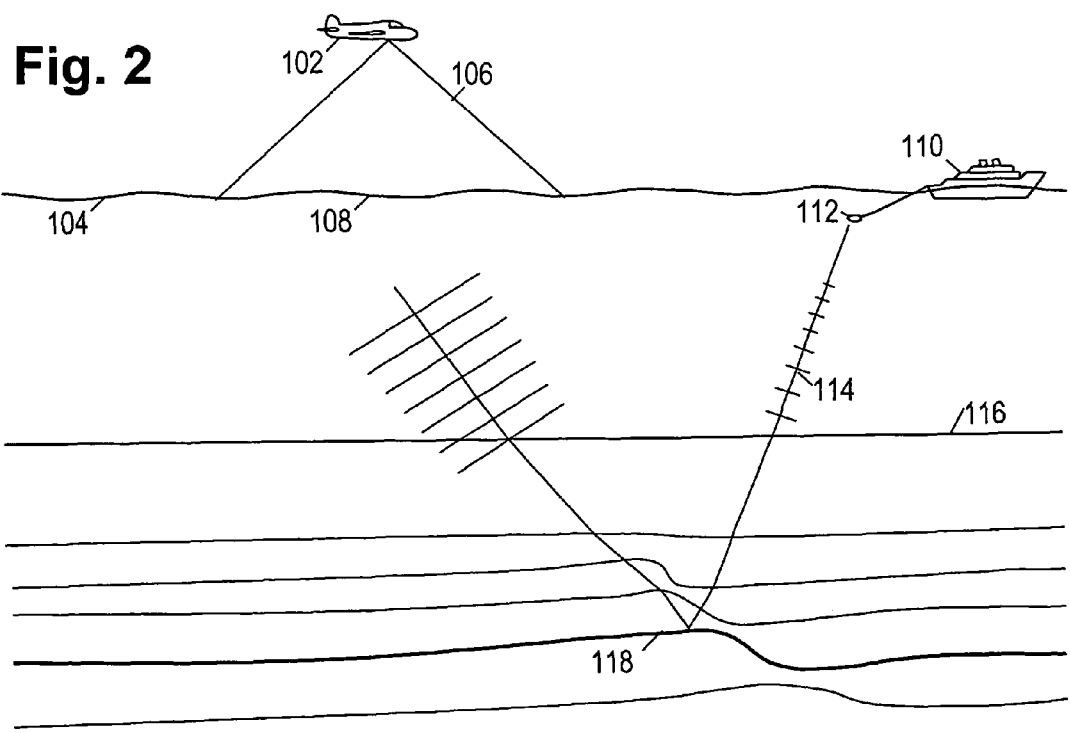
FIG. 2 shows a vertical cross-section of the Earth during an illustrative survey.

FIG. 2 shows a vertical cross-section of the illustrative survey environment. Ship 110 trails a seismic energy source 112 behind it as it moves through the survey area. Suitable energy sources include conventional impulse sources and vibratory sources. A programmable depth controller can be used to maintain the source at a desired depth. Multiple sources can be employed with diverters to control the sources' horizontal position relative to the ship. Source(s) 112 are coupled to electronic equipment on ship 110 which controls the timing of the source firings. The electronic equipment monitors the source location and firing times and communicates this information to plane 102.

To image the subsurface structures below the ocean floor 116, source 112 emits seismic waves 114 that are reflected where there are changes in acoustic impedance contrast, e.g., due to subsurface interface 118 (and other subsurface structures). The reflected waves propagate to the surface 104, causing displacements in the sensing area that plane 102 can detect and convert to seismic traces. The seismic traces provide a record of the time required for the seismic waves 114 to travel from source 112 to subsurface structure 118 and thence to the surface 104, permitting an image of subsurface structure 118 to be obtained after appropriate data processing.

Land-based seismic surveys can be performed in a similar fashion. A vibrator truck or other seismic energy source is systematically moved across a survey region and triggered at selected points. The timing and location of each shot is tracked and combined with the displacement signal information to obtain seismic traces which can be processed in the normal fashion.

FIG. 3 is a block diagram of an illustrative remote seismic survey system. A coherent electromagnetic wave source 302 emits a beam that passes through a beam splitter 304 and a lens system 306 to form an illumination cone 308. Light reflected from the Earth's surface is captured by the lens system 306 and focused to form an image on image detector 314. A reference beam created by the source beam's first passage through the beam splitter 304 is recombined by the beam splitter 304 with the focused beam after having reflected off a mirror 312 and optionally passing through an optical delay module 310. At detector 314 the combined beams create an interference pattern that changes to indicate displacements in the sensing area 108.

Optical delay module 310 provides a reference beam travel time that roughly matches the travel time of the illumination beam, and can take the form of an optical fiber or a propagation medium having a greatly reduced light propagation velocity. If the source 302 has a sufficiently narrow bandwidth (and an accordingly lengthy coherence time), the optical delay module 310 can be omitted.

Detector 314 captures images at a sampling rate that is at least twice the highest frequency component of the seismic energy signal that is to be captured (a 4 ms sampling period is expected to be adequate) and communicated to a signal processor 316. In some embodiments detector 314 is a solid state image detector that measures all image pixels simultaneously. In other embodiments, detector 314 is single sensor that detects light intensity, and image capture is provided by scanning a tightly focused illumination beam in a raster pattern.

Signal processor 316 establishes a correspondence between image pixels and physical locations on the sensing surface 108. Such a correspondence can be initially determined based on position and orientation measurements by a spatial module that tracks the movement of the platform. The spatial module can employ any suitable combination of global positioning system (GPS) technology, cell tower triangulation, altimeter readings, compass readings, gravitational accelerometer readings, radar, laser ranging ("LIDAR"), gyroscopic tracking, and inertial tracking. (Laser ranging can also be used to establish a baseline contour of the earth's surface for use in processing the interference data.) The signal processor 316 can refine this initial correspondence determination by using image processing to compensate for camera motion, platform vibration, and atmospheric effects. In some cases reflectors would be strategically positioned throughout the survey region to provide recognizable patterns for the receiver to reference when determining the relationship between pixels and physical locations. Reflectors can employ modulation using LCD or Kerr cell devices to make them even more distinctive.

Having established an image-position to physical-location correspondence, the signal processor establishes a baseline reference for each physical location of interest. The selected physical locations correspond to the points at which it is desired to extract seismic signals. Although in some cases this can be all physical locations in the sensing area, it is expected that in most cases the physical locations will represent an evenly spaced array of grid points. For example, some survey designs may call for physical locations of 1 square meter in size on a rectangular grid with 10 meter center-to-center spacing.

The baseline reference can be a moving average of intensity values over a selected time interval. Such a baseline enables the system to compensate for changes in measurement conditions such as variations in platform height, ocean waves, boat wakes, wind motions, air temperature changes, ambient light brightness, and brightness of the coherent electromagnetic wave source. Changes of intensity are then determined relative to the baseline reference, enabling the signal processor to measure surface displacements attributable to seismic waves at each of the selected physical locations. The signal processor 316 optionally further compensates the measured displacements for the incidence angle of the beam. (Because displacement is measured along the angle of incidence, a correction is sometimes desirable to estimate the true vertical displacement.)

Signal processor 316 provides the data recording unit 318 with identifications of the physical locations of interest currently present in the sensing area 108, and further provides surface displacement signals for each such location. The data recording unit also receives information from an auxiliary interface 320. The auxiliary information includes seismic source information such as the timing and position of each shot, and can further include information regarding the platform position and orientation, as well as the current configuration of the coherent electromagnetic source and optics.

The data recording unit associates the auxiliary information with the displacement signal information and formulates seismic traces, i.e., the signals that would have been recorded by seismic sensors at each selected location in response to a seismic shot. FIG. 4 shows a set of illustrative seismic traces representing displacement (or alternatively velocity or acceleration) as a function of time after the shot. The signals have been sampled at even time intervals and digitized. Data recording unit 318 can further provide data compression if desired to reduce storage space requirements.

Data recording unit 318 can use any suitable information storage medium. Due to the large volume of information needed to represent seismic survey data, the information storage medium is generally some form of magnetic medium, e.g., disk drives or magnetic tape. However it is expected that the necessary storage capacity may also be provided by optical media or integrated circuit memories, though the associated cost may be somewhat higher. In an alternative embodiment, recording unit 318 simply gathers the data from the receivers and transmits the data in real time to a remote location such as a central storage facility.

The database of seismic traces formed by data recording unit 318 includes shot position information and "receiver" position information for each trace. Thus, as shown in FIG. 5, traces for each of the selected "receiver" positions in sensing area 108 are recorded in response to each of multiple shot positions 502. In a first approximation the seismic energy detected by each receiver (e.g., seismic energy represented by ray 506) is presumed to have reflected from subsurface structures beneath a midpoint 504 between the receiver and the shot position. The receiver positions and shot positions are selected in a manner that provides a dense pattern of midpoints 504, preferably with each midpoint being "hit" by multiple shot-receiver combinations. The remote sensing technique offers a novel freedom in the selection of receiver locations for each shot, creating new opportunities to maximize midpoint hit counts.

The database information is made available (either immediately or at some later time) to a general purpose data processing system 322 such as a server, computer cluster, or supercomputer. Using established seismic processing techniques, the data processing system 322 forms a three-dimensional image of the subsurface structure. Numerous image and seismic processing techniques may be applied to refine the map before it is stored or displayed. A map storage or display unit 324 can take the form of an integrated memory or other information storage medium, a computer printout, and/or a computer monitor that displays the map to a user. Three-dimensional image viewing techniques may alternatively be employed.

Figure 6:
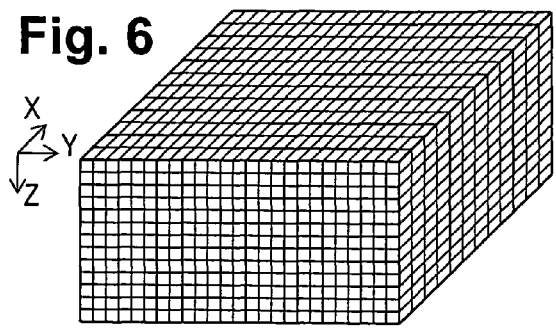
FIG. 6 shows an illustrative data volume.

FIG. 6 shows a "data cube", i.e., a three dimensional array of data values. (Despite the use of the term "cube", the dimensions of the data cube do not have to be equal.) The data cube represents some seismic attribute throughout the subsurface volume of interest. The three-dimensional array preferably consists of uniformly-sized cells, each cell having a data value representing the seismic attribute for that cell. Though seismic energy reflection intensity will be attribute most commonly employed, other seismic attributes are also interesting and can be derived from the measured seismic signals. Thus various seismic attributes may be represented, and in some embodiments, each cell has multiple data values to represent multiple seismic attributes. Examples of other seismic attributes include reflectivity, acoustic impedance, acoustic velocity, and density. The data cube format more readily lends itself to computational analysis and visual rendering, and for this reason, the data cube may be termed a "three-dimensional image" of the survey region.

Figure 7:
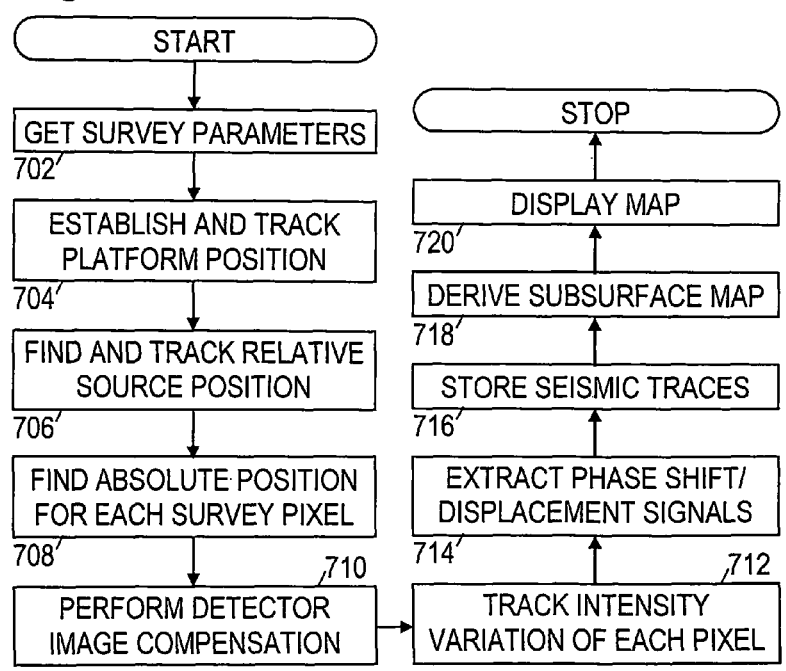
FIG. 7 is a flow diagram of an illustrative survey method.

FIG. 7 is a flow diagram of an illustrative survey method that can be carried out by the system of FIG. 3. Although the various actions are described in a sequential order, it is expected that many of these actions can be distributed among different system components and performed concurrently or in an unordered fashion.

Beginning in block 702 the system obtains the survey parameters. The survey parameters include such things as the physical location of the survey area, the arrangement of detection points within the survey area, the geometry of the illumination beam and its relation to the position and orientation of the platform, sampling rates, seismic trace durations, and data communication and storage formats.

In block 704 the system determines and tracks the position and orientation of the platform as previously described. In block 706 the system establishes wireless communication with the seismic source to find and tracks the seismic source's position. Shot positions and times are also received via this wireless communication link. (In some alternative embodiments, the source tracks and records shot information using a high-precision clock, and this information is later combined with measurements by the detection system which have been similarly tracked using a high-precision clock.)

In block 708, the system establishes a relationship between positions in the images acquired by the video detector and physical positions in the sensing region. As previously discussed, this operation can be performed using position and orientations by a spatial module, and refined using image processing. In block 710, the system performs image compensation to account for platform motion, device vibration, brightness variations, and relatively slow changes in surface 108. As part of the compensation process, the system determines a baseline reference image.

In block 712, the system tracks the intensity variation of each pixel or group of pixels associated with the selected locations. The variations are measured relative to the baseline image. In block 714, the system converts these intensity variations into phase-shift or displacement signals representing the seismic waves impinging on the selected locations. The conversion process depends on the relative size of the ground displacements and the wavelength of the coherent beam, but some ambiguity may be present unless multiple wavelengths are employed or multiple path length differences are evaluated. (These alternatives are discussed further below.)

In block 716 the system stores the displacement signals into seismic traces. This operation includes determining the portions of each signal that relate to a given shot and saving that portion with the corresponding receiver and shot positions. In block 718, the system communicates the seismic trace data to a data processing system for seismic processing. The seismic processing derives a three-dimensional image of the subsurface structure and in block 720 provides the image to a user.

Figure 8:
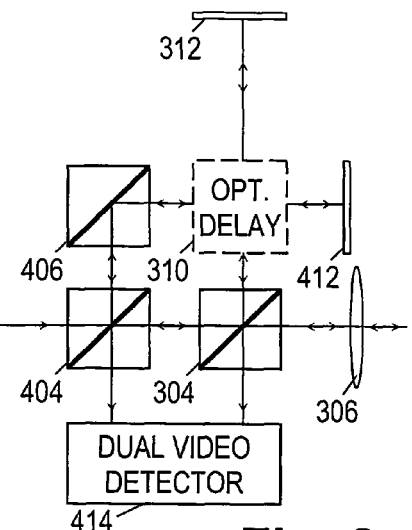
FIG. 8 is a block diagram of an alternative survey system embodiment.

FIG. 8 shows an alternative system embodiment in which two reference beams are created so as to provide interference patterns having different effective reference beam phases. The beam from source 302 passes through two beam splitters 304 and 404, which each create a corresponding reference beam and later recombine that reference beam with the reflected beam. An additional beam splitter 406 is employed to balance the intensity of the second reference beam with the intensity of the reflected beam. Both reference beams pass through the optical delay unit 310 and reflect from mirrors 312, 412.

The mirrors 312 and 412 are positioned to provide a difference in optical path lengths. The net result is that the difference in path lengths traveled by the reflected beam and the first reference beam when they recombine at splitter 304, varies from the difference in path lengths traveled by the reflected beam and the second reference beam when they recombine at beam splitter 404. The variation in differences is preferably a quarter wavelength to produce reference beams that effectively demonstrate a 900 phase difference in the interference patterns at the dual video detectors 414, but other variations are also feasible. A similar effect can be achieved by switching a single reference beams alternately between two path lengths that differ by a quarter wavelength. These alternative embodiments eliminate displacement sign ambiguities that can occur near interference minima and maxima. It is also possible to employ multiple beam wavelengths to effectively eliminate such ambiguities.

Thus, seismic-wave induced ground motion can be detected by way of illuminating an area of the earth from above such as from an aircraft or satellite, with a coherent light source (e.g., a laser), and detecting the light reflection and combining the reflection with a reference beam of the same light. The illumination may be by way of a scanning beam or by flooding an area with the light. Ground motion is detected by gathering the light reflection from afar, which can be accomplished by way of a focusing optic system projecting the reflected light onto one or multiple optical sensors. By combining a reference beam of the initial light source with the reflected beam prior to shining onto the optical sensor or sensors an interference pattern will be generated that will change with ground motion and with other motions other than the ground motion. The characteristics of the different motions will allow the separation of what is most likely to be seismic signals from other motions that are unwanted and considered as "noise".

There are a number of ways to provide the detection and decoding of the desired interferometric patterns, including, but not limited to the following. In some embodiments, a light beam is sent to the earth in a scanning pattern to rasterize the area while simultaneously and synchronously scanning and viewing the area with an optical viewing system. The viewed light reflection would be then combined with the reference light and focused on the optical light intensity detector. In other embodiments the area is flooded with a light source and an optical system focuses the light onto an array of optical sensors. This array could be in the form an image detector device such as used in a television camera, but a custom device would enable a higher sampling rate. In fact the maximum sampling rate provided by a custom device may be higher than required, so a lower sampling rate may be used to obtain the desired resolution while minimizing the collected data volume.

Some embodiments employ a beam with multiple light colors and a multiple color image detection device because the different light frequencies are affected differently by disturbances in the air medium and would be useful in removing the disturbances from the image. As one specific example, beams from three narrowband optical sources (e.g., red, green, blue, or other suitable wavelengths) can be combined to form the source beam which then gets split and into an illumination beam and a reference beam. A single video image detector could be used to detect the interference patterns for each of the three components.

The source of coherent electromagnetic energy need not have an unduly great intensity, as it is only necessary to make the reflected light visible to a special optical system tailored to detect the type and frequency of light used, thus removing any health hazard concerns. Initially, the surveys would be performed at night to reduce the effects of ambient light. However, it is expected that daytime surveys will be possible with the proper selection of light frequencies, modulation, and detectors.

Though the foregoing systems and methods have been described as using controlled seismic shots, they can be readily adapted to the use of passive seismic energy for imaging as described in U.S. Pat. No. 7,383,133, titled "Diffuse seismic imaging systems and methods" by Gary Scott.

Numerous variations and modifications will become apparent to those skilled in the art once the above disclosure is fully appreciated. As one example, multiple platforms can be employed concurrently with different beam wavelengths, and their data combined to obtain three-dimensional displacement measurements at the selected locations. It is intended that the following claims be interpreted to embrace all such variations and modifications.

What is claimed is:

1. A seismic survey method that comprises:
   illuminating a water or ground surface with a beam from a coherent electromagnetic wave source;
   focusing electromagnetic energy reflected from the surface onto at least one image plane;
   combining the reflected electromagnetic energy with a reference beam from the coherent electromagnetic wave source;
   tracking an electromagnetic wave intensity versus time for at least one point in the at least one image plane;
   deriving a displacement signal based at least in part on the tracked electromagnetic wave intensity;
   receiving information from a separate ground unit on the water or ground surface specifying the location and time at which a seismic energy source is triggered and using said information to separate the displacement signal into a seismic trace; and
   storing the seismic trace in an information storage medium.

2. The method of claim 1, wherein said combining the reflected electromagnetic energy with a reference beam is performed in two ways to provide two different path length differences.

3. The method of claim 2, wherein the two path length differences differ by an odd multiple of a quarter wavelength.

4. The method of claim 2, wherein the two combinations are focused on separate image planes.

5. The method of claim 2, wherein the two combinations are alternately focused on said image plane.

6. The method of claim 1, wherein said deriving includes determining a phase difference between the reflected electromagnetic energy and a reference.

7. The method of claim 1, wherein said tracking includes:
   determining a correspondence between points the image plane and physical locations on said surface; and
   compensating for platform motion so that the electromagnetic wave intensity is tracked for one or more physical locations on said surface.

8. The method of claim 1, wherein said tracking includes processing electromagnetic intensities from across the image plane to compensate for image-wide effects.

9. The method of claim 8, wherein the image-wide effects include changes in platform height, changes in brightness, and platform vibration.

10. The method of claim 1, wherein said tracking includes determining a reference image that changes to account for changing measurement conditions.

11. A seismic survey apparatus that comprises:
    a source of coherent electromagnetic energy that illuminates a surface;
    a mechanism that receives electromagnetic energy reflected from a surface and focuses it on a video detector;
    a beam splitter that redirects a portion of the electromagnetic energy from the source and causes it to interfere with the reflected electromagnetic energy as the reflected electromagnetic energy is focused on the video detector;
    a platform that elevates the apparatus over the surface;
    a spatial module that tracks the platform's position and orientation; and
    processing circuitry that tracks electromagnetic energy intensity signals from multiple points on the surface and responsively determines seismic traces, wherein the processing circuitry determines a correspondence between points on the surface and portions of a signal from the video detector based at least in part on outputs from the spatial module and wherein the processing circuitry receives from a separate ground unit information indicative of seismic source firing positions and timing, and responsively associates that information with said seismic traces when storing seismic trace data.

12. The apparatus of claim 11, further comprising a second beam splitter that redirects a second portion of the electromagnetic energy from the source and causes it to interfere with some of the reflected electromagnetic energy with a path length difference that is different from the interfering combination with the first portion by an odd multiple of a quarter wavelength.

13. The apparatus of claim 11, further comprising a unit that varies a difference in path length traveled by the portion of the electromagnetic energy that was redirected and the portion of the electromagnetic energy that reflected from the surface, wherein the variation is by at least one quarter wavelength.

* * * * *